May 12, 1925.　　　　　　　　　　　　　　　　1,537,485
A. H. MIDGLEY
JUNCTION BOX FOR ELECTRICAL CONNECTIONS
Filed April 3, 1922　　　2 Sheets-Sheet 1
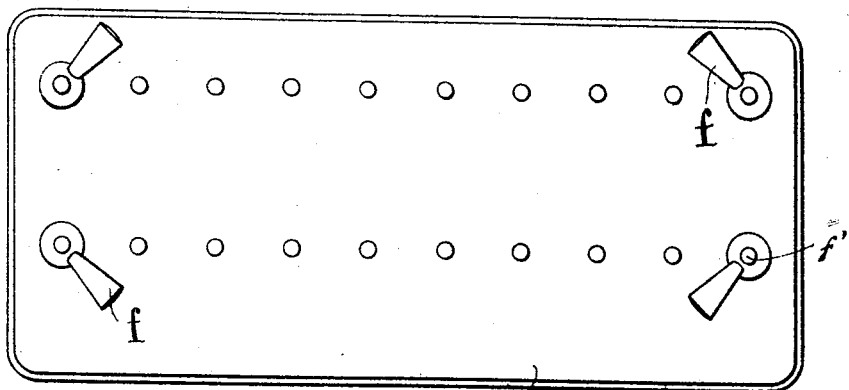
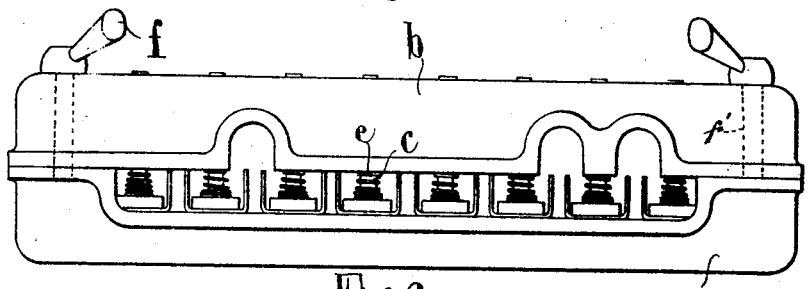
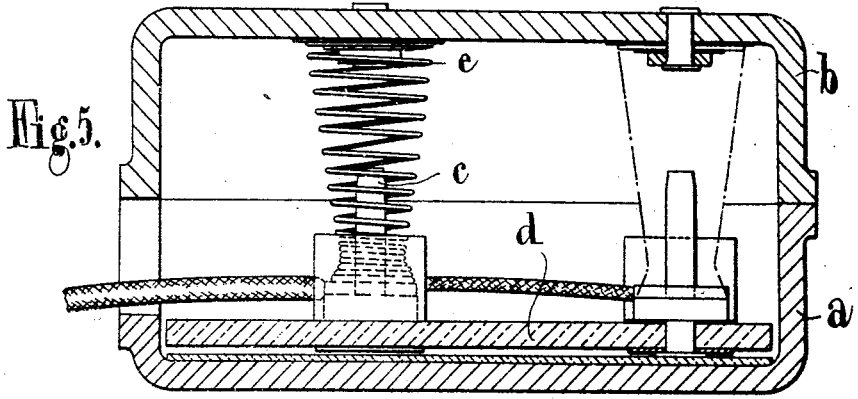
Inventor
A. H. Midgley,
By Marks & Clerk
Attys.

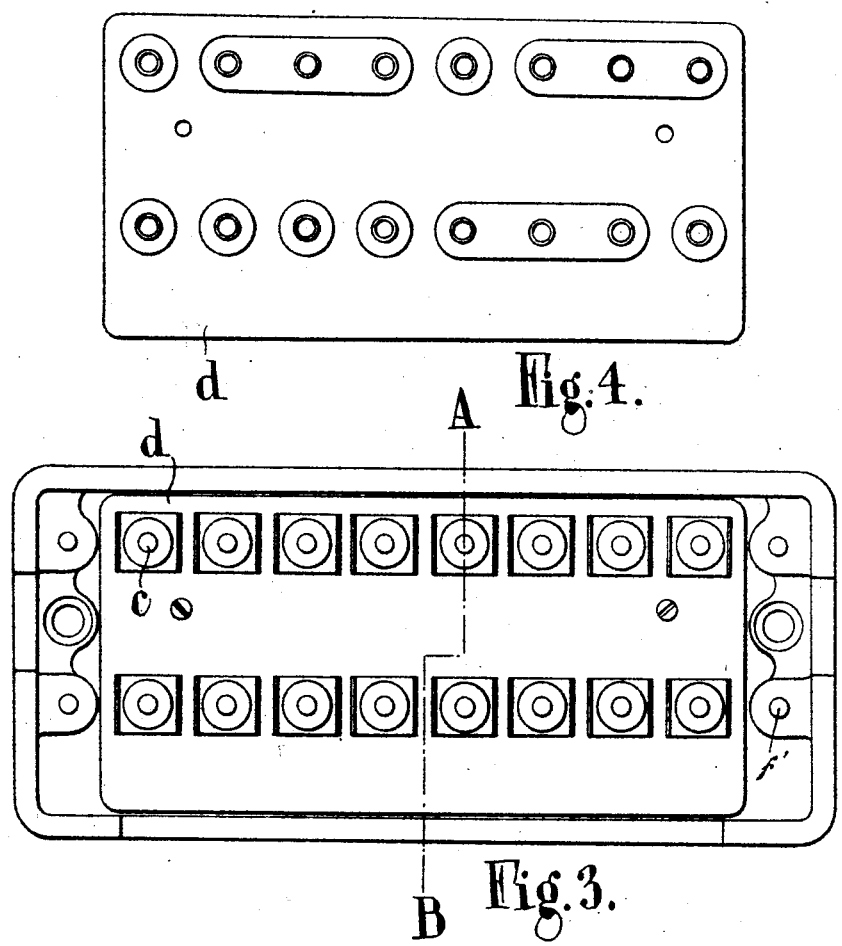

Patented May 12, 1925.

1,537,485

UNITED STATES PATENT OFFICE.

ALBERT HENRY MIDGLEY, OF UXBRIDGE, ENGLAND, ASSIGNOR TO MIDGLEY CAR LIGHTING COMPANY, LIMITED, OF LONDON, ENGLAND.

JUNCTION BOX FOR ELECTRICAL CONNECTIONS.

Application filed April 3, 1922. Serial No. 549,332.

*To all whom it may concern:*

Be it known that I, ALBERT HENRY MIDGLEY, a subject of the King of Great Britain and Ireland, and residing at "Fairfield," Harefield Road, Uxbridge, in the county of Middlesex, England, have invented certain new and useful Improvements in Junction Boxes for Electrical Connections, of which the following is a specification.

This invention relates to junction boxes for electrical connections with more particular reference to those which are required for use upon motor vehicles, aircraft or in other situations where they are liable to be subject to vibration, the object of the invention being to provide means whereby any required electrical connections may be rapidly and readily completed without the necessity for the use of the usual screws, nuts, &c., and without any liability of their becoming loose or detached due to vibration.

The invention consists in a junction box in which the various connections are maintained by spring pressure.

More specifically the invention consists in a junction box in which the wires or terminals of the connections are held in place on studs or other contacts within the junction box by means of springs which are placed under compression when the lid or cover is fitted to the box.

The invention also comprises other details and arrangements hereinafter described or indicated.

The accompanying drawings illustrate one mode of carrying out the invention.

Figure 1 is a plan of one form of junction box in accordance with the invention;

Figure 2 is a front elevation;

Figure 3 is a plan with the cover removed;

Figure 4 is a reverse plan of the plate carrying the contacts shown in Figure 3, and Figure 5 is a section of the complete box taken on the line A-B of Figure 3 and drawn on a larger scale.

In carrying my invention into effect in one convenient manner I provide a junction box consisting of two parts, namely, the box itself $a$ and a lid or cover $b$ for the same, and within the box I arrange a number of studs or other contacts $c$ riveted or otherwise secured to an insulating baseplate $d$ and connected together according to the connections required for any number of circuits with which the junction box is to be employed.

The ends of the wire connections to the various contacts may be looped round the studs $c$ or may be provided with suitable terminals or caps adapted to be slipped on to the studs.

The lid or cover $b$ is provided with a number of insulated bushes or other insulating means carrying helical or coiled springs $e$ which are positioned in a manner corresponding to the position of the studs or other contacts and are of such dimensions that when the cover is secured in place on the casing by means of screws, bolts, or other fastening devices, such as bolt and nut arrangements $f$, each spring will pass over its corresponding stud and will be placed in a condition of compression in order to maintain the wire loop or terminal in close contact with its stud.

In connection with the foregoing it is to be observed that the fastening device, in the present instance the bolts $f$ either in the form of threaded studs or separate shanks inserted through the box $a$ and rising therefrom, being situated at or adjacent the corners of the box act as guides when engaged by the corresponding openings in the lid for ensuring of the several springs being accurately arranged over the studs $c$, as apparent.

It will be understood that the foregoing details of construction are given by way of example and not of limitation since the essential feature of the invention is the maintenance of contact by means of spring pressure or tension and any construction and arrangement of studs or contacts and springs arranged in association therewith which will give the desired effect falls within the spirit and scope of the invention.

Having now described my invention, what I claim as new and desire to secure by Letters Patent is:—

1. A junction box comprising a base member, a stud mounted thereon and insulated therefrom, a cover, spring means mounted on the cover and insulated therefrom, said spring means including a portion adapted to surround said stud and located in a position so that when the cover is placed on the base member the spring means will surround the stud and be compressed.

2. A junction box comprising a base member, a plurality of studs mounted thereon and insulated therefrom, a cover and a plurality of coiled springs mounted on the cover and insulated therefrom and arranged to register with and surround the studs when the cover is placed on the base member and in addition being of such a length that when the cover is secured the springs are compressed.

3. A junction box as claimed in claim 1, wherein fastening means are situated at the corners of the box and include shanks projecting upwardly from the base acting as guides when the cover is engaged therein to ensure of all of the springs being arranged over the corresponding studs.

In testimony whereof I have signed my name to this specification.

ALBERT HENRY MIDGLEY.